(12) United States Patent
Burnett et al.

(10) Patent No.: US 10,788,504 B2
(45) Date of Patent: Sep. 29, 2020

(54) APPARATUS FOR CONTROLLING SAMPLE POSITION IN A LIQUID CHROMATOGRAPHY SYSTEM

(75) Inventors: Joshua A. Burnett, Taunton, MA (US);
James E. Usowicz, Webster, MA (US);
Marc Lemelin, Douglas, MA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 2295 days.

(21) Appl. No.: 13/520,194

(22) PCT Filed: Jan. 11, 2011

(86) PCT No.: PCT/US2011/020727
§ 371 (c)(1),
(2), (4) Date: Nov. 19, 2012

(87) PCT Pub. No.: WO2012/154147
PCT Pub. Date: Nov. 15, 2012

(65) Prior Publication Data
US 2018/0172716 A1 Jun. 21, 2018

Related U.S. Application Data

(60) Provisional application No. 61/293,858, filed on Jan. 11, 2010.

(51) Int. Cl.
*G01N 35/02* (2006.01)
*G01N 35/04* (2006.01)
*B01D 15/08* (2006.01)

(52) U.S. Cl.
CPC .......... *G01N 35/025* (2013.01); *B01D 15/08* (2013.01); *G01N 2035/0441* (2013.01);
(Continued)

(58) Field of Classification Search
None
See application file for complete search history.

(56) References Cited

U.S. PATENT DOCUMENTS 3,581,574 A * 6/1971 Smith .................... G01N 35/10
141/130
4,344,768 A * 8/1982 Parker .................... G01N 35/10
422/561
(Continued)

FOREIGN PATENT DOCUMENTS

DE 4313399 A1 10/1993
EP 0321154 A2 6/1989
(Continued)

OTHER PUBLICATIONS

International Search Report and Written Opinion for counterpart international application No. PCT/US2011/020727, dated Mar. 29, 2011; 9 pages.
(Continued)

*Primary Examiner* — Matthew D Krcha
(74) *Attorney, Agent, or Firm* — Schmeiser, Olsen & Watts LLP

(57) ABSTRACT

Described is an apparatus for controlling a position of a sample in a liquid chromatography system. The apparatus includes a rotary drive mechanism, a stepper motor and a rotational coupling system such as a drive belt and pulley system. The rotational coupling system transfers the rotational motion of a motor shaft to a shaft of the rotary drive mechanism. Advantageously, the stepper motor is remote to the sample compartment for improved safety in the event that volatile gas accumulates within the sample compartment. The rotary drive mechanism can be configured in a small form factor and can provide highly stable rotation of an attached sample tray to accommodate the requirements of compact liquid chromatography systems. In addition, leak- (Continued)

age from inside the sample compartment to the ambient environment is substantially reduced or eliminated, resulting in better thermal control of the sample compartment.

15 Claims, 3 Drawing Sheets

(52) U.S. Cl.
CPC ............ *G01N 2035/0475* (2013.01); *G01N 2035/0484* (2013.01); *G01N 2035/0491* (2013.01)

(56) References Cited

U.S. PATENT DOCUMENTS

| | | | |
|---|---|---|---|
| 4,622,457 A | 11/1986 | Bradley et al. | |
| 4,695,430 A * | 9/1987 | Coville | B01L 3/508 |
| | | | 422/534 |
| 4,713,974 A * | 12/1987 | Stone | G01N 30/24 |
| | | | 422/64 |
| 4,867,947 A | 9/1989 | Andersen et al. | |
| 5,132,012 A | 7/1992 | Miura et al. | |
| 5,229,074 A * | 7/1993 | Heath | G01N 35/1004 |
| | | | 422/64 |
| 5,670,114 A | 9/1997 | Sakazume et al. | |
| 5,783,087 A * | 7/1998 | Vlock | B01D 15/00 |
| | | | 210/650 |
| 6,071,477 A | 6/2000 | Auclair et al. | |
| 6,152,868 A | 11/2000 | Walters | |
| 6,228,636 B1 * | 5/2001 | Yahiro | C12M 23/48 |
| | | | 312/236 |
| 2001/0007643 A1 * | 7/2001 | Homer Glenn A | G01N 35/026 |
| | | | 422/549 |
| 2002/0129525 A1 | 9/2002 | Kissinger et al. | |
| 2004/0020310 A1 * | 2/2004 | Escal | B04B 5/0421 |
| | | | 73/864.21 |
| 2006/0160162 A1 | 7/2006 | Fulwyler et al. | |

FOREIGN PATENT DOCUMENTS

| | | | |
|---|---|---|---|
| EP | 0386855 A1 | 9/1990 | |
| WO | WO-2011056165 A1 * | 5/2011 | B01F 9/002 |

OTHER PUBLICATIONS

Partial Search Report in European Patent Application No. 11864906.0, dated Nov. 22, 2017; 18 pages.
Extended European Search Report in European Patent Application No. 11864906.0, dated Mar. 19, 2018; 14 pages.

* cited by examiner

APPARATUS FOR CONTROLLING SAMPLE POSITION IN A LIQUID CHROMATOGRAPHY SYSTEM

RELATED APPLICATION

This application claims the benefit of the earlier filing date of U.S. Provisional Patent Application Ser. No. 61/293,858, filed Jan. 11, 2010 and titled "Apparatus for Controlling Sample Position in a Liquid Chromatography System," the entirety of which is incorporated herein by reference.

FIELD OF THE INVENTION

The invention relates generally to liquid chromatography systems. More particularly, the invention relates to an apparatus for controlling a sample position in a liquid chromatography system.

BACKGROUND

High performance liquid chromatography (HPLC) and ultra performance liquid chromatography (UPLC) systems typically include a sample compartment that is adapted for receiving a number of sample vials or wells each containing a sample for analysis. Sample vials are arranged in one or more sample trays that can be loaded into and removed from the sample compartment by a user. Some systems use an automated process in which the sample needle is moved within the sample compartment to a sample vial. The sample needle is then inserted into the vial to extract the sample and subsequently inject the sample into a high pressure mobile phase. The accuracy and repeatability of the positioning of the sample needle is important to ensure proper loading from each vial.

Space constraints within a HPLC or UPLC system can limit the location of motors and mechanisms used to control the position of the sample needle. In addition, thermal control of the sample compartment makes leakage from the compartment and condensation generated within the compartment significant concerns. Moreover, in some test configurations, a buildup of volatile gas can occur in the sample compartment such that motor operation within the compartment is undesirable.

The present invention addresses the problems set forth above and provides additional advantages.

SUMMARY OF THE INVENTION

In one aspect, the invention features apparatus for controlling a position of a sample in a liquid chromatography system. The apparatus includes a rotary drive mechanism, a stepper motor and a drive belt. The rotary drive mechanism includes a shaft having a first portion within a sample compartment of a liquid chromatography system and a second portion external to the sample compartment. The rotary drive mechanism also includes a pulley secured to the second portion of the shaft and a rotary position encoder disposed about the second portion of the shaft. The stepper motor has a motor shaft and is located outside the sample compartment. The drive belt engages the pulley and the motor shaft.

In another aspect, the invention features an apparatus for controlling a position of a sample in a liquid chromatography system. The apparatus includes a rotary drive mechanism, a stepper motor and a coupling element. The rotary drive mechanism includes a shaft having a first portion within a sample compartment of a liquid chromatography system and a second portion external to the sample compartment. The rotary drive mechanism also includes a rotational coupling secured to the second portion of the shaft and a rotary position encoder disposed about the second portion of the shaft. The stepper motor has a motor shaft and is located outside the sample compartment. The coupling element engages the rotational coupling of the rotary drive mechanism and the motor shaft.

In yet another aspect, the invention features a method of mixing sample fluids within a sample vial for a liquid chromatography measurement. According to the method, a sample vial containing at least two sample fluids is rotated in a forward direction at a first rotation rate and then rotated in a reverse direction at a second rotation rate. The steps of rotating in the forward direction and then the reverse direction are repeated to thereby mix the two or more sample fluids.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

DETAILED DESCRIPTION

In brief overview, the invention relates to an apparatus for controlling a position of a sample in a liquid chromatography system. The apparatus includes a rotary drive mechanism, a stepper motor and a rotational coupling system such as a drive belt and pulley system. The rotational coupling system transfers the rotational motion of a motor shaft to a shaft of the rotary drive mechanism. The shaft extends through a wall of a sample compartment of the liquid chromatography system. Advantageously, the stepper motor is remote to the sample compartment to improve safety for instances when volatile gas accumulates within the sample compartment. As used herein, a stepper motor means any motor that rotates a motor shaft in fixed increments. The rotary drive mechanism can be configured in a small form factor and can provide highly stable rotation of an attached sample tray to accommodate the requirements of compact liquid chromatography systems. In addition, leakage from inside the sample compartment to the ambient environment is substantially reduced or eliminated, resulting in better thermal control of the sample compartment.

Figure 1A:
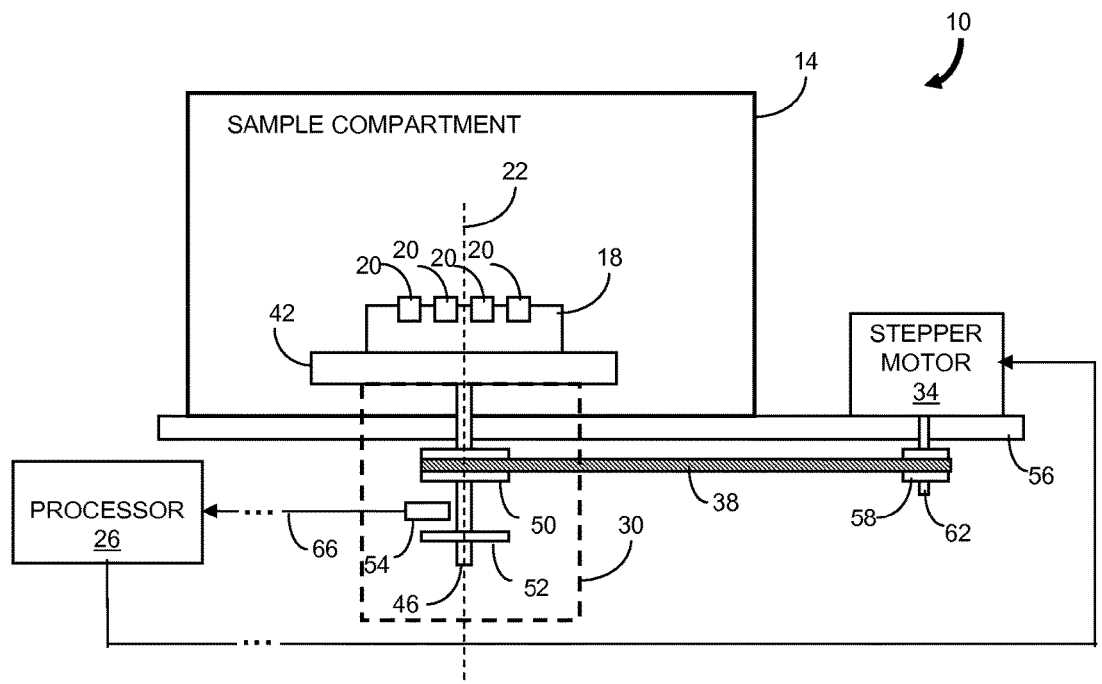
FIG. 1A is a cross-sectional side view illustration of a portion of a liquid chromatography system including a sample compartment according to an embodiment of the invention.
Figure 1B:
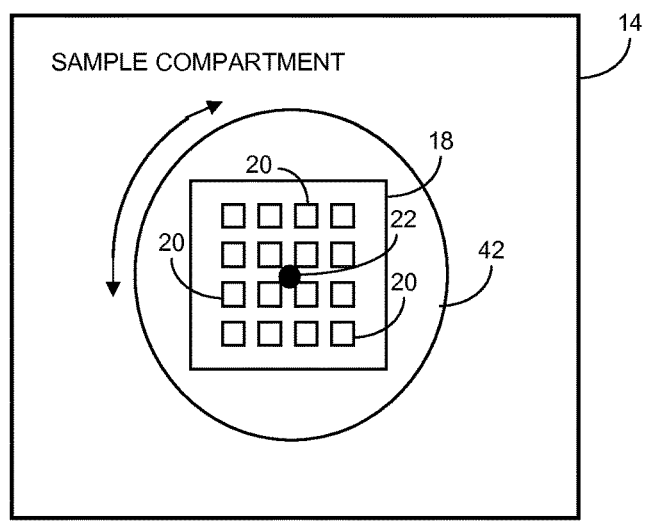
FIG. 1B is a cross-sectional top down view illustration of the sample compartment of FIG. 1A.

FIG. 1A is a cross-sectional side view illustration of a portion of a liquid chromatography system 10 including a sample compartment 14 according to an embodiment of the invention. FIG. 1B is a top down view cross-sectional illustration of the sample compartment 14. As used herein, a sample compartment means a substantially enclosed volume in which a number of sample vials or wells are maintained in a thermally controlled environment. The sample compartment 14 includes at least one removable sample tray 18 that is rotated with respect to a vertical axis 22. A sample needle (not shown) is controlled by a translation mechanism that, in combination with the apparatus of the invention, allows for one of the samples 20 held in the sample tray 18 to be injected into the mobile phase of the chromatography system for analysis. The apparatus for controlling the rotational position of the sample tray 18 and the translation mechanism for positioning the sample needle are controlled by a processor 26 to enable any samples 20 to be accessed in an automated manner.

In the illustrated embodiment, the apparatus for controlling the position of a sample includes a rotary drive mechanism 30, a stepper motor 34 and a drive belt 38. The rotary drive mechanism 30 includes a mounting platform 42 to receive the sample tray 18, a shaft 46, a pulley 50 and a rotary position encoder that includes an encoder disc 52 and disc reader 54. The shaft 46 includes a first (upper) portion disposed in the sample compartment 14 and a second (lower) portion disposed outside the sample compartment 14. The pulley 50 is protected by a housing (not shown) that surrounds a region of the second portion of the shaft 46 near the base 56 of the sample compartment 14.

The vertical gap between the encoder disc 52 and disc reader 54 is maintained at a desired value (e.g., between 0.005 in. and 0.010 in.) to ensure reliable reading of the angular position of the shaft 46. As shown, the disc reader 54 is in the form of a small printed circuit board or planar element with wires extending through a cable 66. The wires conduct electrical signals from the disc reader 54 to the processor 26 to enable the angular position and rotation rate of the sample tray 18 to be determined. Condensation from the sample compartment 14 through a leakage path around the shaft 46 can adversely affect the operation of the rotary position encoder. In a preferred embodiment, the disc reader 54 and encoder disc 52 are components of a magnetic rotary position encoder suitable for operation in an environment subject to condensation. If condensation is not a limiting factor, other rotary position encoders known in the art, such as an optical encoder, can be used.

An acceptable angular resolution for the rotary position encoder is based on the accuracy required to position the sample needle with respect to the samples. In one embodiment using a high density sample tray (e.g., 384 samples), the angular resolution is smaller than 0.10°.

The stepper motor 34 generates the rotational motion to turn the shaft 46 of the rotary drive mechanism 30. The stepper motor 34 is mounted at a location that is remote to the sample compartment 14 so that any electrical discharge associated with motor operation occurs distant to volatile gas that may accumulate in the sample compartment 14. A drive pulley 58 secured to the motor shaft 62 engages the drive belt 38 which in turn is coupled to the pulley 50 on shaft 46. Thus rotation of the motor shaft 62 imparts a rotation to the shaft 46 of the rotary drive mechanism 30 to thereby rotate the sample tray 18 about the vertical axis 22.

Figure 2A:
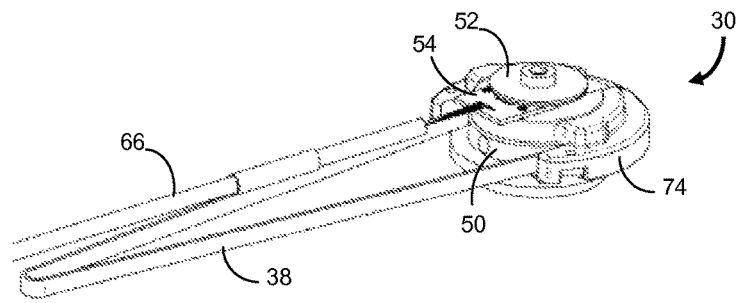
FIG. 2A is an isometric view of the rotary drive mechanism and drive belt of FIG. 1A and FIG. 1B.
Figure 2B:
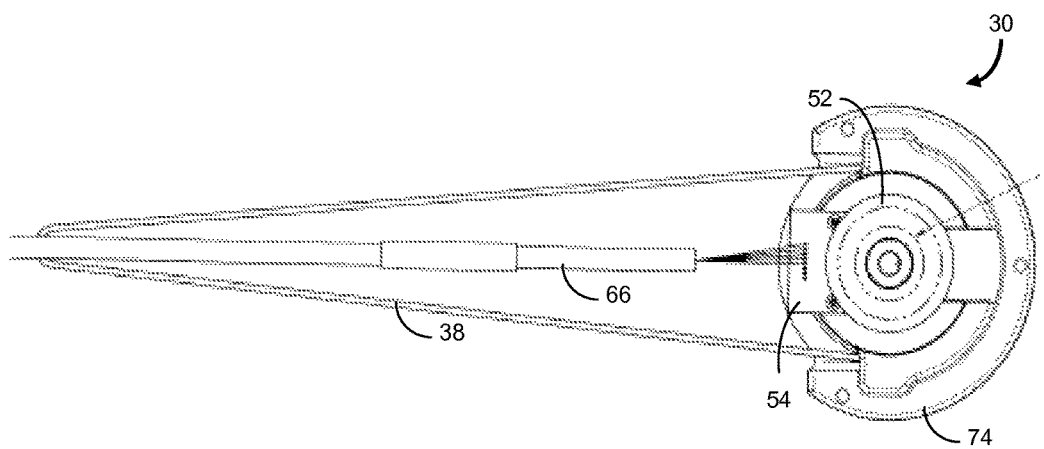
FIG. 2B is a bottom view of the rotary drive mechanism and drive belt of FIG. 2A.
Figure 2C:
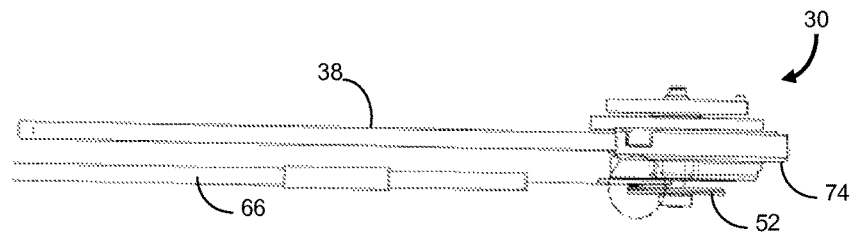
FIG. 2C is a side view of the rotary drive mechanism and drive belt of FIG. 2A.

FIG. 2A is an isometric view of the rotary drive mechanism 30 and drive belt 38. The housing 74 that encloses the pulley 50 is visible. FIGS. 2B and 2C show a bottom view and a side view, respectively, of the rotary drive mechanism 30 and drive belt 38.

Figure 3:
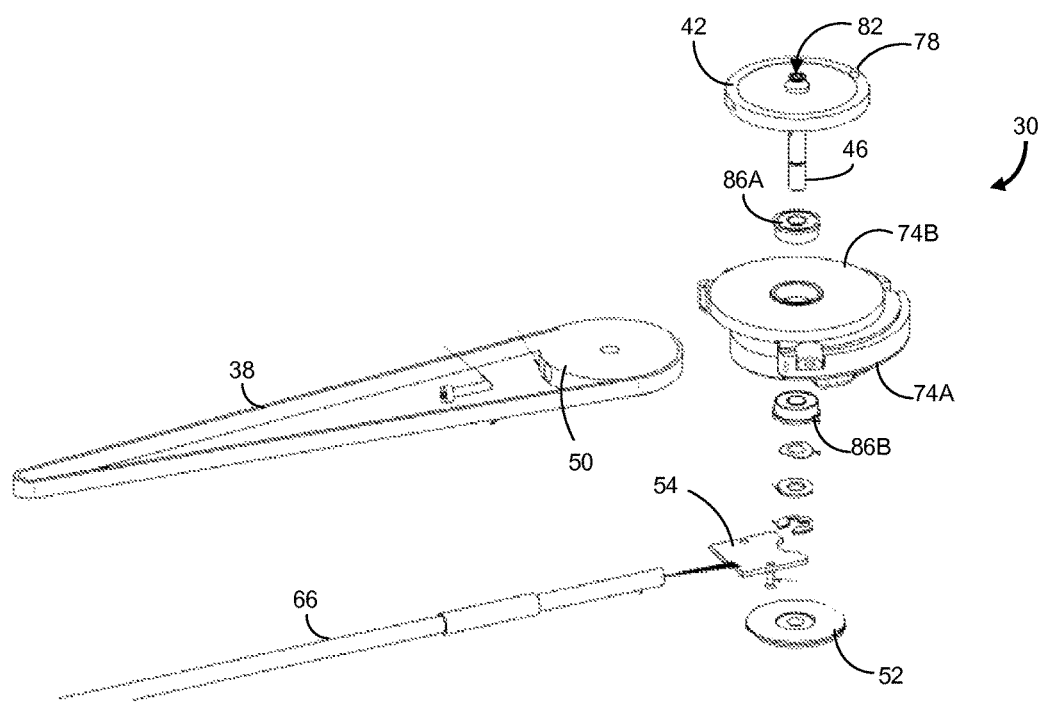
FIG. 3 is an exploded view of the rotary drive mechanism and drive belt of FIG. 2A.

FIG. 3 is an exploded view of the rotary drive mechanism 30 and drive belt 38. In the figure, the drive belt 38 and pulley 50 are shown displaced to the left of the pulley housing components 74A and 74B. The mounting platform 42 includes a reference pin 78 that engages an opening on the sample tray 18 so that the angular orientation of the tray 18 is known with respect to the angular position of the shaft 46. The mounting platform 42 is secured to the shaft 46 by a set screw or by other means as is known in the art. The sample tray 18 is secured to the mounting platform 42 by way of a bolt that engages a threaded region 82.

Dual bearings 86A and 86B are spaced apart from each other so that the "walk" at the outer portion of the sample tray 18 is reduced. Convex washers between the bearing 86B and the encoder disc 52 are used to preload the bearings 86.

As described above, the apparatus of the invention allows for accurate control of the position of a sample in a liquid chromatography system. The apparatus can also be used for other purposes. For example, two or more sample fluids can be mixed in a sample vial by first drawing a sample fluid from one vial and adding it to a second vial containing a different sample fluid. The motor 34 is commanded to rotate in a first (forward) direction and then a second (reverse) direction to shake the vial and agitate the sample fluids.

The angular range of motion and the frequency of the forward and reverse motion cycle are inversely related due to motor torque and power limitations. The angular range of motion, the frequency of the motion cycle and the duration of mixing can be selected according to user preference. A smaller vial may require a greater shaking force or a longer mixing duration than a larger vial because surface tension in the vial can restrict the motion of the sample fluids. By way of a specific example, the frequency may be in a range of 3-10 Hz with an angular range of motion of 3°-10°. The force exerted on the vial is dependent on the distance of the vial from the axis of rotation. Vials located farthest from the axis of rotation 22 experience the greatest force. By way of a specific example, a rotation cycle frequency of 10 Hz for a 3° angular range can result in a force at an "outermost" vial that exceeds 20 m/s2. Mixing durations can be a few seconds or more than a minute.

While the invention has been shown and described with reference to specific embodiments, it should be understood by those skilled in the art that various changes in form and detail may be made therein without departing from the spirit and scope of the invention as recited in the accompanying claims. For example, the pulleys and belt described in the embodiments above can be replaced by other types of rotational couplings and coupling elements. In a specific example, a series of gears can be used to transfer the rotation of the motor shaft to the shaft of the rotary drive mechanism.

What is claimed is:

1. A system for controlling a position of a sample, comprising:
   a liquid chromatography system;
   a sample compartment of the liquid chromatography system mounted on a top surface of a base, the sample compartment comprising an enclosure having a bottom wall, a top wall, and side walls that connect the bottom wall to the top wall, thereby defining the enclosure, wherein the sample compartment is configured to maintain a number of sample vials or wells in a thermally controlled environment, in which a sample needle of the liquid chromatography system aspirates the sample from the sample vials or wells for injection into a mobile phase of the liquid chromatography system for chromatographic analysis by the liquid chromatographic system;
a rotary drive mechanism for controlling a rotational position of a sample tray enclosed within the enclosure, comprising:
   a shaft that extends through an opening in the bottom wall, the shaft having a first portion disposed inside the sample compartment and a second portion external to the sample compartment;
   a mounting platform disposed inside and enclosed by the enclosure and secured to the first portion of the shaft, the mounting platform configured to receive the sample tray;
   a pulley secured to the second portion of the shaft, wherein the pulley is disposed below the base; and
   a rotary position encoder disposed about the second portion of the shaft;
a stepper motor having a motor shaft, the stepper motor being external to the sample compartment and mounted on the top surface the base; and
a drive belt engaging the pulley and the motor shaft.

2. The system of claim 1 wherein the motor shaft has a drive pulley affixed thereto and wherein the drive belt engages the drive pulley.

3. The system of claim 1 wherein the rotary position encoder comprises a magnetic position encoder.

4. The system of claim 1 wherein the rotary position encoder comprises an optical encoder.

5. The system of claim 1 wherein the rotary position encoder comprises:
   an encoder disc secured to the second portion of the shaft; and
   a disc reader disposed proximate to the second portion of the shaft between the drive pulley and the encoder disc, wherein the disc reader generates a signal indicative of an angular position of the shaft.

6. The system of claim 1 further comprising a processor module in communication with the rotary position encoder to receive a signal therefrom indicating at least one of an angular position of the shaft and a rotation rate of the shaft.

7. The system of claim 1, further comprising a drive pulley secured to the motor shaft and disposed below the base, the drive pulley engaging the drive belt.

8. The system of claim 7, wherein the motor shaft extends through the base.

9. A system for controlling a position of a sample, comprising:
   a liquid chromatography system;
   a sample compartment of the liquid chromatography system, comprising an enclosure having a bottom wall, a top wall, and side walls that connect the bottom wall to the top wall, thereby defining the enclosure wall, wherein the sample compartment is configured to maintain a number of sample vials or wells in a thermally controlled environment, in which a sample needle of the liquid chromatography system aspirates the sample from the sample vials or wells for injection into a mobile phase of the liquid chromatography system for chromatographic analysis by the liquid chromatographic system;
   a rotary drive mechanism, comprising:
      a shaft that extends through an opening in the bottom wall, the shaft having a first portion disposed inside the sample compartment and a second portion external to the sample compartment;
      a mounting platform disposed inside and enclosed by the enclosure and secure to the first portion of the shaft, the mounting platform configured to receive a sample tray;
      a first rotational coupling secured to the second portion of the shaft; and
      a rotary position encoder disposed about the second portion of the shaft and disposed below the base;
   a stepper motor having a motor shaft, the stepper motor being external to the sample compartment and mounted on the top surface of the base; and
   a coupling element engaging the first rotational coupling of the rotary drive mechanism and the motor shaft.

10. The system of claim 9 wherein the motor shaft has a second rotational coupling that engages the coupling element.

11. The system of claim 10 wherein the first and second rotational couplings are pulleys and the coupling element is a drive belt.

12. The system of claim 1, wherein the enclosure is located at a center of the apparatus.

13. The system of claim 9, wherein the enclosure is located at a center of the apparatus.

14. The system of claim 9, further comprising a drive pulley secured to the motor shaft and disposed below the base, the drive pulley engaging a drive belt.

15. The system of claim 9, wherein the motor shaft extends through the base.

* * * * *